United States Patent [19]

Yoshikawa

[11] Patent Number: 4,617,896
[45] Date of Patent: Oct. 21, 1986

[54] INTERNAL COMBUSTION ENGINE HAVING THREE INTAKE VALVES PER CYLINDER

[75] Inventor: Masaaki Yoshikawa, Iwata, Japan

[73] Assignee: Yamaha Hatsudoki Kabushiki Kaisha, Iwata, Japan

[21] Appl. No.: 711,979

[22] Filed: Mar. 14, 1985

[51] Int. Cl.⁴ .............................................. F02B 15/00
[52] U.S. Cl. ................................... 123/432; 123/308; 123/188 M
[58] Field of Search .................... 123/308, 432, 188 M

[56] References Cited

U.S. PATENT DOCUMENTS

| | | | |
|---|---|---|---|
| 3,408,992 | 11/1968 | Von Seggern et al. | 123/188 M |
| 4,256,068 | 3/1981 | Irimajiri et al. | 123/432 |
| 4,285,310 | 8/1981 | Takizawa et al. | 123/432 |
| 4,350,126 | 9/1982 | Honda | 123/432 |
| 4,479,470 | 10/1984 | Ishida | 123/308 |
| 4,488,531 | 12/1984 | Tadokoro et al. | 123/432 |

FOREIGN PATENT DOCUMENTS

0183553  11/1982  Japan .................... 123/308

Primary Examiner—E. Rollins Cross
Attorney, Agent, or Firm—Ernest A. Beutler

[57] ABSTRACT

Several embodiments of induction systems for internal combustion engines embodying three intake valves per cylinder. Each system divides the induction passage for each cylinder into at least two parts and a flow controlling throttle valve is positioned in one of the parts. In some embodiments, the parts have equal effective flow areas and in others they have unequal flow areas. In further embodiments, there are three intake passages serving the same chamber and throttle valves are positioned in two if them. In some of these embodiments, the throttle valves are operated simultaneously while in others they are operated in staged sequence.

12 Claims, 8 Drawing Figures

INTERNAL COMBUSTION ENGINE HAVING THREE INTAKE VALVES PER CYLINDER

BACKGROUND OF THE INVENTION

This invention relates to an internal combustion engine having at least three intake valves per cylinder and more particularly to an improved arrangement for such engines.

The advantages in achieving high output through the use of multiply intake valves per cylinder are well known. However, multiple valve engines generally have poor performance at lower engine speeds, even though they provide high maximum speed output. For this reason, the use of more than two valves per cylinder has been thought to be impractical for engines that are adapted to run over a wide range of engine speeds and loads, such as is typical with general purpose automotive engines. As a result, the maximum power output of such engines is somewhat limited.

It is, therefore, a principal object of this invention to provide an intake valve arrangement for an internal combustion engine that permits the use of more than two intake valves and which still will provide good performance at all engine speeds.

It is a further object of this invention to provide a valve arrangement for an internal combustion engine wherein the performance throughout the entire speed and load ranges is improved.

SUMMARY OF THE INVENTION

This invention is adapted to be employed in an internal combustion engine having a combustion chamber, a plurality of intake passages for delivering a charge to the combustion chamber and at least three intake valves in the combustion chamber for controlling the flow through the intake passages to the combustion chamber. In accordance with the invention, throttle valve means are provided for controlling the flow through at least one of the intake passages independently of the flow through another of the intake passages.

DETAILED DESCRIPTION OF THE PREFERRED EMBODIMENTS

Figure 1:
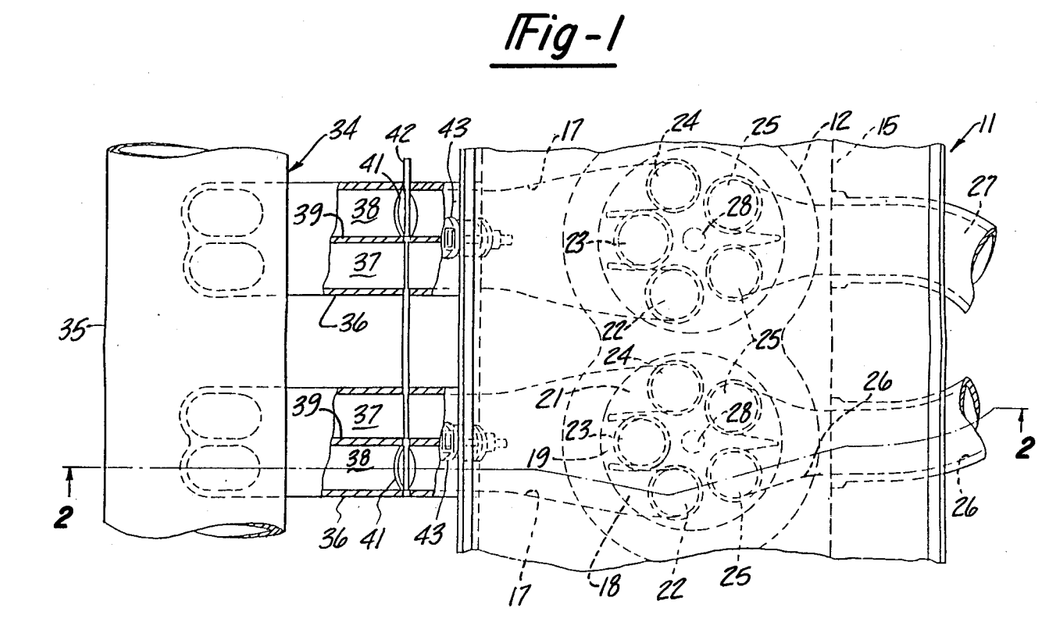
FIG. 1 is a top plan view of a portion of an internal combustion engine constructed in accordance with an embodiment of the invention, with portions broken away.
Figures 2, 3:
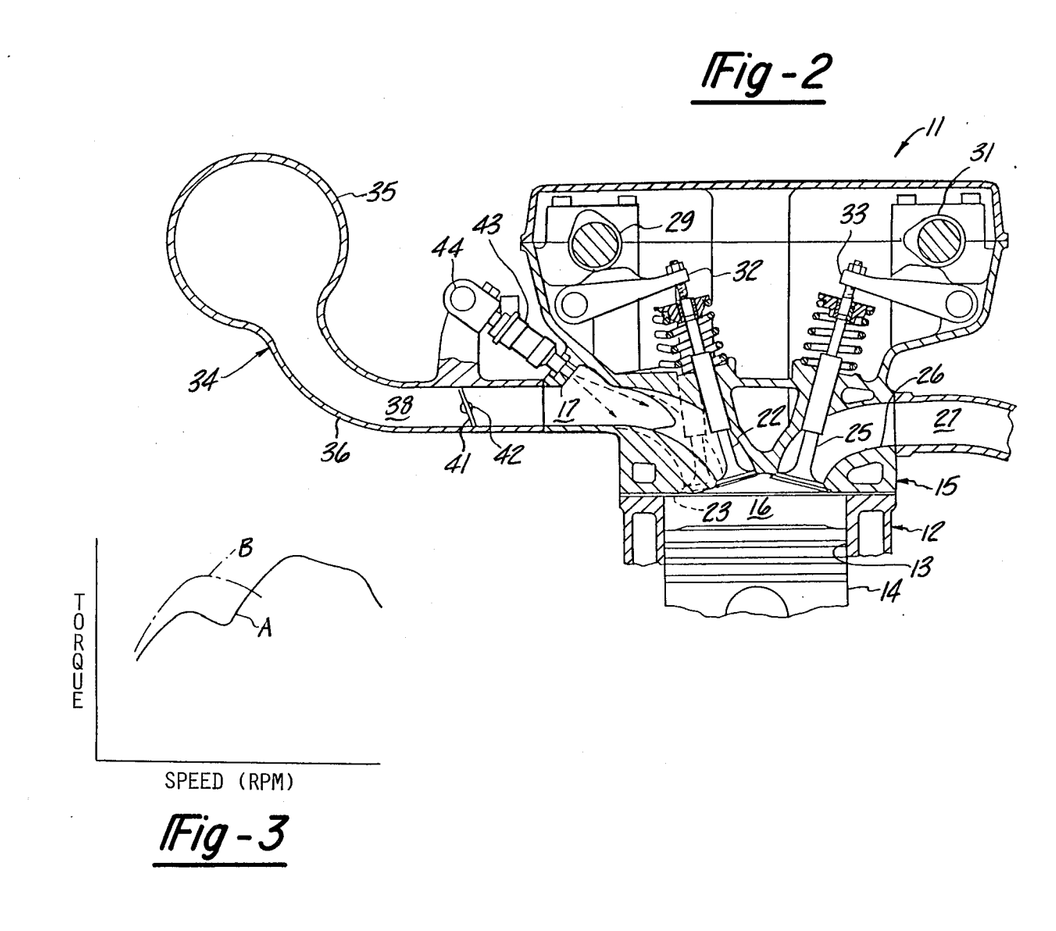
FIG. 2 is a cross-sectional view taken generally along the line 2—2 of FIG. 1.
FIG. 3 is a diagrammatic view showing how the mid-range performance can be improved with this embodiment.

Embodiment Of FIGS. 1 Through 3

An internal combustion constructed in accordance with a first embodiment of the invention is identified generally by the reference numeral 11. The engine 11 is comprised of a cylinder block 12 having cylinder bores 13 in which pistons 14 are supported for reciprocation in a known manner. The pistons 14 drive a suitable output shaft in a known manner, as by means of connecting rods (not shown).

A cylinder head 15 is affixed to the cylinder block 12 in an appropriate manner and has individual cavities that cooperate with the cylinder bores 13 and piston 14 to form a chamber of variable volume, indicated by the reference numeral 16 and which may at times be referred to as the combustion chamber.

An induction system is provided for introducing a charge into the combustion chamber 16 and is comprised of an intake passage 17 that is formed in the cylinder head 15. The intake passage 17 has an inlet opening that opens through one side of the cylinder head and which extends to a respective of the combustion chambers 16 through individual branched passages 18, 19 and 21 that communicate with each other at their inlet ends and which terminate in respective valve seats, the flow through which is controlled by respective intake valves 22, 23 and 24 of the poppet type. The intake valves 22, 23 and 24 are disposed in a manner as described in the copending application entitled "Four-Cycle Engine", Ser. No. 369,665, filed Apr. 19, 1982, in the name of Masaaki Yoshikawa, and assigned to the assignee of this application. As disclosed therein, the intake valves 22 and 24 are disposed with their stems at a steeper angle to the axis of the cylinder bore 13 than the intake valve 23 and their heads lie partially on one side of a plane passing through the center of the cylinder bore axis. In addition, the stems of the intake valves 22, 23 and 24 all lie radially inwardly of an extension of the cylinder bore 13 so as to provide a compact configuration. Reference may be had to the aforenoted copending application for a further description of the intake valves and their locations and orientation.

A pair of exhaust valves 25 are positioned on the opposite side of the aforementioned plane and control the flow through exhaust passages 26 formed in the cylinder head 15 and which terminates in exhaust outlet ports in the side of the head 15 opposite to the inlet port passage 17. A suitable exhaust manifold 27 collects gases from the exhaust passages 26 for discharge to the atmosphere through an appropriate exhaust system (not shown).

A spark plug 28 is positioned in each cylinder and supported by the cylinder head 15 geneally centrally of the axis of the respective cylinder bores 13. The spark plugs 28 may be fired in any appropriate manner.

Supported within the cylinder head 15 is an intake camshaft 29 and an exhaust camshaft 31 which may be driven in any suitable manner. These camshafts 29 and 31 operate the respective intake valves 22, 23 and 24 and the exhaust valves 25 through appropriate rocker arms 32 and 33.

The induction system for the engine 11 further includes an intake manifold, indicated generally by the reference numeral 34. The intake manifold 34 is formed with an enlarged plenum chamber 35 that has an outside air inlet (not shown) in which a main, manually operated throttle valve is positioned. Individual runners 36 extend from the plenum chamber 35 to each of the cylinder head induction passages 17. The runners 36 are divided into first and second passages 37 and 38 by a dividing wall 39 that terminates approximately at the inlet end of the cylinder head intake passage 17.

A flow controlling throttle valve of the butterfly type 41 is positioned in each of the intake manifold second passages 38. The throttle valves 41 are all secured on a common shaft 42. In accordance with the invention, the throttle valves 41 may be held in a closed position until either the main throttle valve of the engine is opened a substantial degree or the load on the engine or its speed, as sensed in any of the known manners, reaches a predetermined value and then the throttle valves 41 are progressively opened. This may be done through a suitable linkage system including a lost motion connection or by utilization of a vacuum actuator for the throttle valves 41, as is well known in this art.

A plurality of fuel injection nozzles 43 are mounted in the cylinder head 15 each in proximity to the inlet ends of respective of the cylinder head intake passages 17. Fuel is supplied to the injection nozzles 43 from a fuel manifold 44 and the timing and amount of fuel discharged can be controlled in any of the known manners. Because the injection nozzle 43 discharges into a common portion of the intake passages, there will be good fuel distribution to the chamber through the respective intake valves 22, 23 and 24 that will insure good combustion.

By employing the separate intake passages 37 and 38 and by using the control throttle valves 41 in the manner generally described, it is possible to improve the mid-range torque of the engine 11 without adversely affecting the wide open power performance. This may be understood by reference to FIG. 3 wherein the torque speed curve is shown under two conditions. The curve A, shown in solid lines, represents the torque curve for the engine with the throttle valves 41 held in their fully opened position. This is the conventional type of arrangement and, as may be readily apparent from this figure, there is very poor low range torque. In addition, there is, in fact, a dip in the torque curve at normal engine running speeds encountered during most driving conditions in automotive application. In order to provide better torque at low running conditions, the throttle valves 41 are closed at low and mid-range speeds until maximum power output is required. As has been noted, this may be done either by a suitable linkage system or any of the automatic controls which are known. The dot-dash line curve B shows the improved torque when this is done. It should be seen that by restricting the cross-sectional area of the intake passages effectively by closing the throttle valves 41 that greater torque is achieved that when all passages are open. At the point wherein the flow is restricted, as indicated by the falling off of the torque curve B, the throttle valves 41 are opened and the curve A will be rejoined so as to improve performance throughout the entire speed range without any sacrifices in maximum power output.

Figure 4:
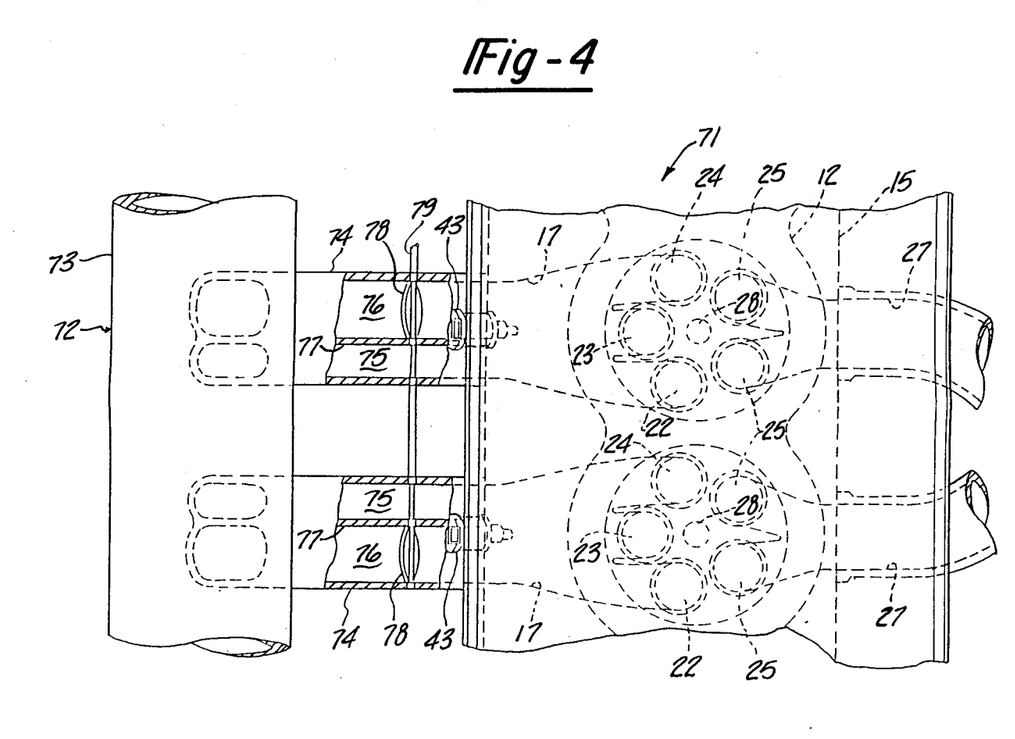
FIG. 4 is a top plan view, with portions broken away, in part similar to FIG. 1 and shows a further embodiment of the invention.

Embodiment Of FIG. 4

In the embodiment of FIGS. 1 through 3, the intake manifold was formed with two induction passages that served each of the cylinder head induction passages and these two passages had substantially equal effective areas with a throttle valve in one of the passages to control its flow and improve mid-range torque.

In FIG. 4, another embodiment of the invention is identified generally by the reference numeral 71. This embodiment differs only from the preceding embodiment in the construction of the induction manifold and its throttle valve arrangement. For that reason, the cylinder block, cylinder head and associated components have been identified by the same reference numerals as applied in FIGS. 1 and 2 and these components will only be described again insofar as is necessary to understand the construction and operation of this embodiment.

The engine 71 is provided with an induction manifold, indicated generally by the reference numeral 72, that includes a plenum chamber 73 having an inlet device (not shown) in which a manually positioned throttle valve is located for controlling the flow into the plenum chamber 73.

A plurality of individual runners 74 extend from the plenum chamber 73 to the individual cylinder head intake passages 17 and specifically the inlet ends of these intake passages. The runners 74 are divided into first, 75, and second, 76, intake passages by means of an interconnecting wall 77. Unlike the embodiment of FIGS. 1 through 3, however, the passage 75 has a substantially smaller effective cross-sectional area than the passage 76. In one form of the invention, the passage 75 has approximately one-third of the total effective induction system area for each cylinder while the passage 76 has two-thirds of the total area for each cylinder. Of course, other ratios may be employed as will be readily apparent to those skilled in the art.

Butterfly type throttle valves 78 are positioned in the second induction passages 76 and are all carried on a common throttle valve shaft 79. As with the embodiment of FIGS. 1 through 3, the throttle valves 78 are normally held closed at idle and low speed operation and are then opened progressively as the engine speed and/or load increases. This may be done by means of either a suitable linkage system or by providing any of the known types of automatic actuators that are responsive to engine load and/or speed. In this way, it is possible to obtain good low speed torque as well as good torque and running at the mid-ranges while still achieving maximum power output.

Figure 5:
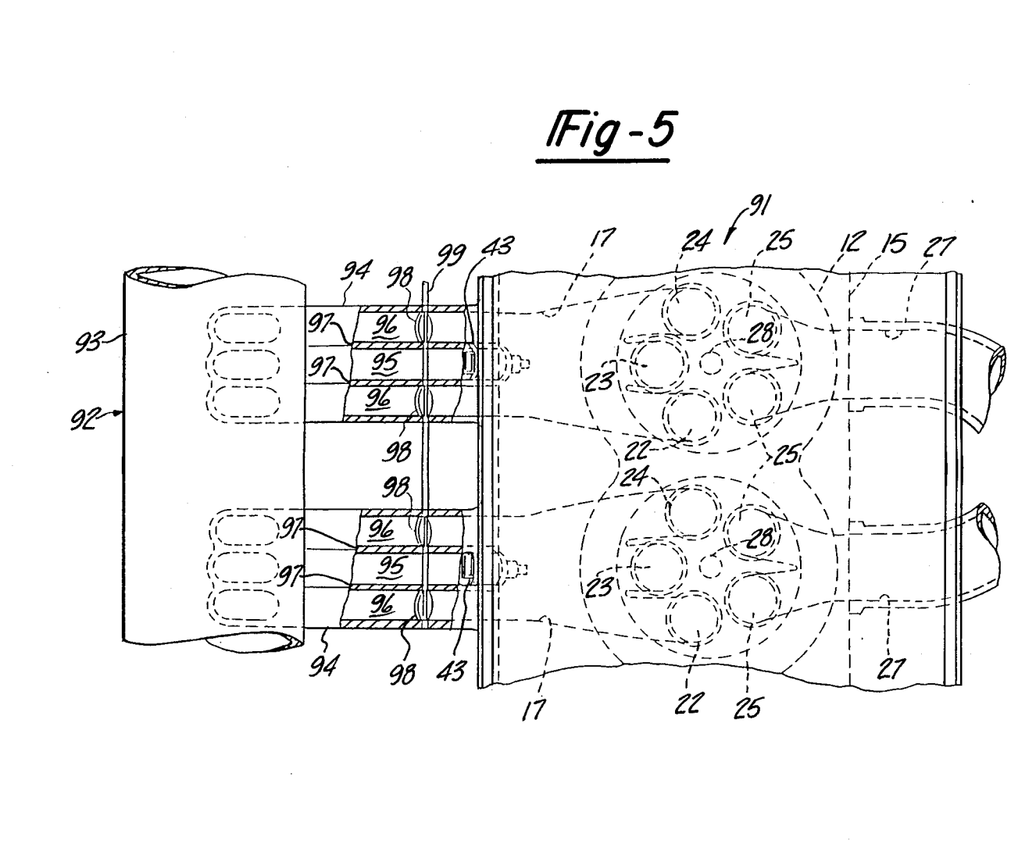
FIG. 5 is a top plan view, with portions broken away, similar to FIGS. 1 and 4, showing a still further embodiment of the invention.

Embodiment Of FIG. 5

The reference numeral 91 illustrates a still further embodiment of the invention as applied to an internal combustion engine. Like the embodiment of FIG. 4, the engine 91 differs from the embodiment of FIGS. 1 through 3 only in the intake manifold. For that reason, the cylinder block, cylinder heads and components associated with them have been identified by the same reference numerals and will not be described again.

In this embodiment, an intake manifold indicated generally by the reference numeral 92 is provided with a plenum chamber 93 that has an inlet end in which a main, manually operated throttle valve is positioned, as with the previously described embodiments. Individual runners, indicated generally by the reference numeral 94 extend from the plenum chamber to the cylinder head 15 for serving the inlet ends of the respective cylinder head intake passages 17. In this embodiment, the runners 94 are divided into first, 95, and pairs of second, 96, intake passages. Walls 97 serve this separating function. Each of the passages 95 and 96 are each of substantially the same effective cross-sectional area. Pairs of throttle valves 98 are provided in each of the second passages 96 of each runner 94 and are all connected to a common throttle valve shaft 99. As with the previous embodiments, the throttle valve shaft 99 is controlled so that the throttle valves 98 will be maintained in a substantially close position at idle and low speed and then opened progressively as the engine and/or load increases. Thus, low speed running is improved without any sacrifice in mid or high range output.

Figures 6, 7:
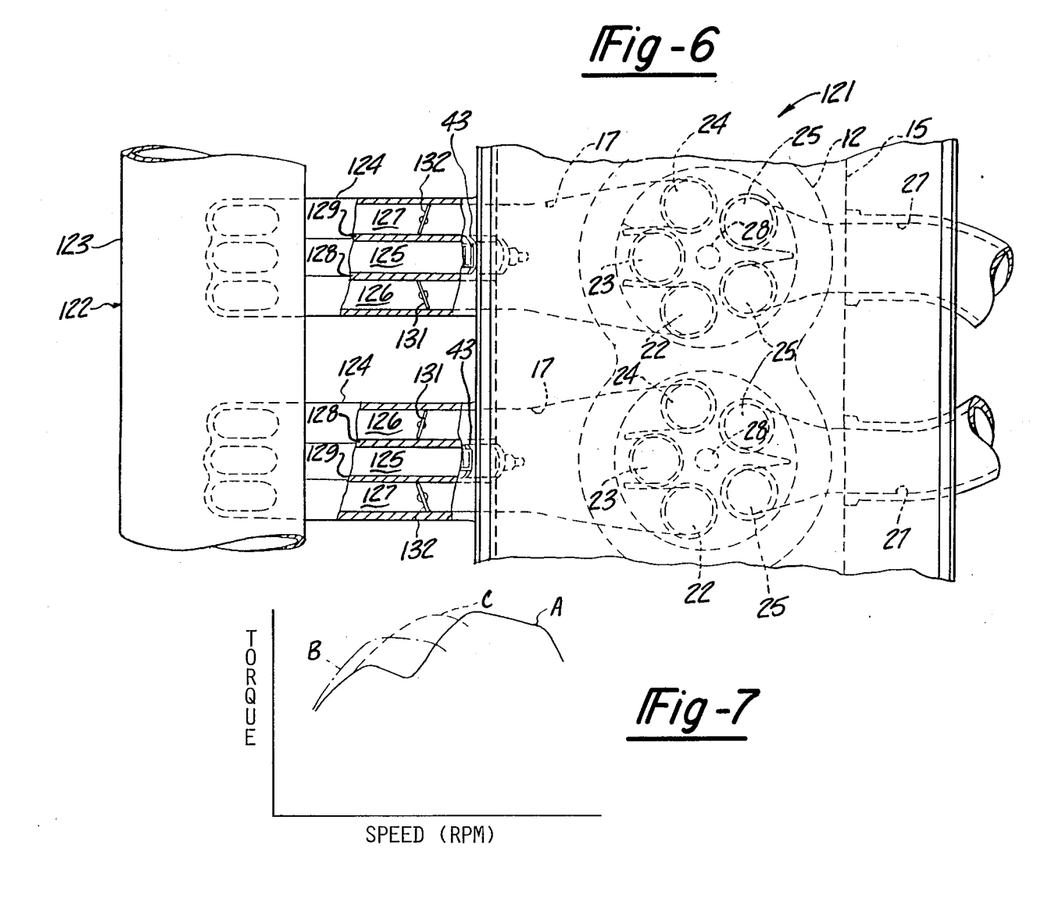
FIG. 6 is a top plan view, with portions broken away, in part similar to FIGS. 1, 4 and 5, showing a yet further embodiment of the invention.
FIG. 7 is a curve showing how the mid-range performance of the embodiment of FIG. 6 is improved over conventional engines.

Embodiment Of FIGS. 6 And 7

An internal combustion engine constructed in accordance with a still further embodiment of the invention is identified by the reference numeral 121. Like the embodiments of FIGS. 4 and 5, this embodiment differs from the preceding embodiments and that of FIGS. 1 through 3 only in the construction and operation of the intake manifold and its throttle valve arrangement. Thus, the main components of the engine have been identified by the same reference numerals in this figure.

An intake manifold, indicated generally by the reference numeral 122, is provided with a plenum chamber 123 having an inlet device (not shown) in which a manually operated throttle valve is positioned.

Individual runners 124 extend from the plenum chamber 123 to the inlets of respective of the individual cylinder head intake passages 17. As with the embodiment of FIG. 5, the runners 124 are divided into three passageways, 125, 126 and 127 by respective walls 128 and 129. As with the previously described embodiment, the passageways 125, 126 and 127 each have the same respective cross-sectional area.

First throttle valves 131 are positioned in the passageways 126 for controlling their flow. The throttle valves 131 are suitably linked to each other so that they will all be operated simultaneously and this may be done either by means of a progressive linkage system or through some type of load control arrangement.

Additional throttle valves 132 are positioned in the intake passages 127 and these throttle valves 132 are all linked together for simultaneou rotation. However, the throttle valves 132 are not operated in unison with the throttle valves 131 as in the previously described embodiments.

In this embodiment, a suitable linkage system or automatic accuator operates the throttle valves 132 to open in a staged sequence with the throttle valves 131 so that the throttle valves 131 begin their opening movement before the throttle valves 132 begin to open. In this way, idle and low speed requirements are provided by the passageway 125 and increasing load requirements are supplied by the passageways 125 and 126 while high mid-range and maximum output are supplied by all the passageways 125, 126 and 127.

FIG. 7 shows how this arrangement improves the torque and running characteristics throughout the entire load and speed ranges. The solid line torque curve A in this figure indicates the torque of the engine with the throttle valves 131 and 132 maintained in their fully opened position. As with FIG. 3, it will be seen that there is a rather low torque output at low speeds and a rather severe dip in the torque curve at mid-range. The curve B shows the running condition with both throttle valves 131 and 132 maintained in their closed condition. As will be seen, the torque continues to increase over that of the curve A up until an off idle or low speed condition at which the torque curve will then begin to taper off. The torque curve C, shown in broken lines, is the torque curve with the throttle valve 131 opened and the throttle valve 132 closed. It is seen from this torque curve that by opening the throttle valve 131 at the point the torque curve B starts to fall off, that a dip in the torque curve is avoided and a significant improvement in mid-range torque can be achieved. Thus, this embodiment provides a still further improved torque curve over the previously described embodiments.

Figure 8:
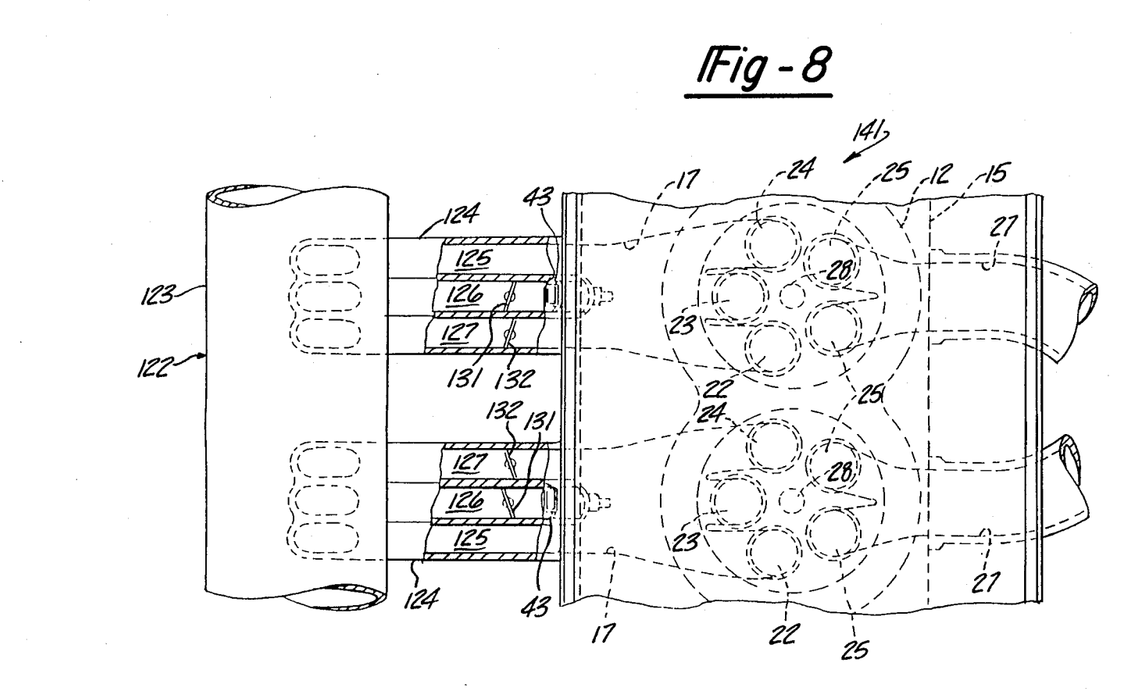
FIG. 8 is a top plan view, with portions broken away, in part similar to FIGS. 1, 4, 5 and 6, showing yet another embodiment of the invention.

Embodiment Of FIG. 8

An internal combustion engine constructed in accordance with a yet further embodiment of the invention is identified generally by the reference numeral 141. Like the previous embodiments, the construction of the basic engine is the same as FIGS. 1 through 3 and only the construction of the intake manifold and its throttle valve arrange differs from the previously described embodiments. For this reason, the basic components of the engine have been identified by the same reference numerals as applied in FIGS. 1 through 3 and the construction and operation of these components can be understood by reference to the description of that embodiment.

The intake manifold arrangement of this embodiment is substantially the same as the embodiment of FIGS. 6 and 7, however, the orientation of the individual intake passages associated with each cylinder head intake passage 17 is varied. Because of this, the same reference numerals have been employed so as to identify the same induction passages of the previously described embodiment.

In the embodiment of FIGS. 6 and 7, the intake passage 125 was disposed between the passageways 126 and 127. In this embodiment, the passageways 125, 126 and 127 are oriented in that order and the throttle valves 131 and 132 are still located in the respective passageways 126 and 127, respectively. The construction shown in this embodiment will cause the low speed charge to enter the chamber primarily at one side of the cylinder bore and thus will introduce a swirl to the intake charge in a circumferential direction about the axis of the cylinder bore. As the engine speed is increased and the passageways 126 begin to flow, this swirl will somewhat diminish and it will be completely eliminated by the time the throttle valves 132 are opened and all three passageways are flowing.

It should be readily apparent from the aforenoted description of the various embodiments that arrangements have been provided that will permit maximum power output of an internal combustion engine without any sacrifice of low speed or mid-range running capabilities. That is, the torque curve is optimized throughout the entire speed and low ranges so as to provide good running under all conditions normally encountered.

Although a number of embodiments of the invention have been illustrated and described, various changes and modifications may be made without departing from the spirit and scope of the invention, as defined by the appended claims.

I claim:

1. An internal combustion engine having a combustion chamber, a plurality of intake passages having independent portions and terminating at at least three intake ports for delivering a charge to said combustion chamber, at least three intake valves in said combustion chamber for controlling the flow through respective of said intake ports to said combustion chamber, and throttle valve means in said independent portions for controlling the flow through at least one of said intake passages independently of the flow through another of said intake passages.

2. An internal combustion engine as set forth in claim 1 wherein the intake passages all interconnect with each other downstream of the throttle valve means and upstream of the intake ports.

3. An internal combustion engine as set forth in claim 2 wherein there are two intake passages.

4. An internal combustion engine as set forth in claim 3 wherein the throttle valve means comprises a single throttle valve positioned in the one intake passage.

5. An internal combustion engine as set forth in claim 3 wherein the intake passages have different effective areas.

6. An internal combustion engine as set forth in claim 5 wherein the throttle valve is in the induction passage having the larger effective flow area.

7. An internal combustion engine as set forth in claim 2 wherein there are first, second and third intake passages.

8. An internal combustion engine as set forth in claim 7 wherein the throttle valve means comprises a pair of throttle valves, one positioned in the one intake passage and another positioned in another of the intake passages.

9. An internal combustion engine as set forth in claim 8 wherein the throttle valves are linked for simultaneous operation.

10. An internal combustion engine as set forth in claim 8 wherein the throttle valves are opened in a staged sequence.

11. An internal combustion engine as set forth in claim 2 further including fuel injection means for delivering a fuel charge to the area where the intake passages interconnect with each other.

12. An internal combustion engine as set forth in claim 10 wherein the intake valves are spaced circumferentially around a cylinder bore of the associated combustion chamber, the unthrottled intake passage being in primary communication with an outermost of the intake valves so as to induce a swirl to the charge delivered to the chamber when the throttle valves are closed.

* * * * *